United States Patent

[11] 3,624,564

[72] Inventors Yukihiko Ise; Yuichi Kaname; Kingo Wada, all of Osaka-fu, Japan

[21] Appl. No. 4,196
[22] Filed Jan. 20, 1970
[45] Patented Nov. 30, 1971
[73] Assignee Matsushita Electric Industrial Co., Ltd. Kadoma, Osaka, Japan

[54] PIEZOELECTRIC CERAMIC BAND-PASS FILTER
5 Claims, 9 Drawing Figs.

[52] U.S. Cl. .......... 333/72, 310/9.6
[51] Int. Cl. .......... H03h 9/00
[50] Field of Search .......... 333/71, 72; 310/9.4, 9.6, 9.8

[56] References Cited

UNITED STATES PATENTS

| | | | |
|---|---|---|---|
| 3,416,104 | 12/1968 | Argoudelis | 333/72 |
| 3,222,622 | 12/1965 | Curran et al. | 333/72 |
| 3,189,851 | 6/1965 | Fowler | 333/72 |
| 3,456,214 | 7/1969 | Bies | 333/72 |
| 2,988,714 | 6/1961 | Tehon | 333/72 |
| 3,396,327 | 8/1968 | Nakazawa | 333/72 |

*Primary Examiner*—Herman Karl Saalbach
*Assistant Examiner*—C. Baraff
*Attorney*—Wenderoth, Lind & Ponack

ABSTRACT: A band-pass wave filter comprising of a first piezoelectric ceramic resonator which is provided with a pair of first input electrodes and a pair of first output electrodes, and which has a resonant mode of vibration at a predetermined frequency, a second piezoelectric ceramic resonator which is provided with a pair of second input electrodes and a pair of second output electrodes, and which has a resonant mode of vibration at a said predetermined frequency, a first shunt inductance combined in parallel with said pair of first input electrodes, a second shunt inductance connected between said pair of first output electrodes and said pair of second input electrodes, and a third shunt inductance which is connected in parallel with said pair of second output electrodes and which is opposite in the polarity to said pair of second input electrodes.

INVENTORS
YUKIHIKO ISE
YUICHI KANAME
KINGO WADA

BY Wenderoth, Lind & Ponack
ATTORNEYS

INVENTORS
YUKIHIKO ISE
YUICHI KANAME
KINGO WADA

BY Wenderoth, Lind & Ponack
ATTORNEYS

INVENTORS
YUKIHIKO ISE
YUICHI KANAME
KINGO WADA

BY Wenderoth, Lind & Ponack
ATTORNEYS

INVENTORS
YUKIHIKO ISE
YUICHI KANAME
KINGO WADA

BY Wenderoth, Lind & Ponack
ATTORNEYS

INVENTORS
YUKIHIKO ISE
YUICHI KANAME
KINGO WADA

BY Wenderoth, Lind & Ponack
ATTORNEYS

PIEZOELECTRIC CERAMIC BAND-PASS FILTER

BACKGROUND OF THE INVENTION

1. Field of the invention

This invention relates to wave filters and in particular to an improved band-pass filter employing cascaded piezoelectric ceramic resonators combined with inductances.

2. Description of the Prior Art

Band-pass wave filters have long been known in the art and most frequently consist of various assemblages of capacitors and inductors appropriately tuned and connected to form networks operative for the intended application. Also known to the art are several types of piezoelectric filters such as consisting of several piezoelectric resonators combined with capacitors, and consisting wholly of piezoelectric resonators.

The filters consisting of capacitors and inductors have the disadvantage of being relatively bulky and furthermore, particularly in the high selective filters, require large numbers of elements connected in complex networks. Piezoelectric filters, on the other hand, particularly in the low-frequency range from 30 kHz. to 100 kHz. also are bulky and have various disadvantages of very narrow bandwidth, high cost, and asymmetrical response.

The present invention is to provide an improved band-pass filter which overcomes one or more of these disadvantages.

SUMMARY OF THE INVENTION

An object of the present invention is to provide novel band-pass filter which is characterized by a wide passband and high selectivity.

A further object of the present invention is to provide an improved band-pass filter which is characterized by low insertion loss and a flat passband.

A further object of the present invention is to provide an improved band-pass filter which has a relatively symmetrical passband and a pole of attenuation at both the upper and lower sides of the passband.

A still further object of the present invention is to provide improved carrier wave filters which are used in multichannel telecommunication, particularly, in the frequency range from 30 kHz. to 100 kHz.

Other objects of the present invention will become apparent to those conversant with the art from the following detailed description taken in conjunction with the annexed drawings wherein:

DESCRIPTION OF A PREFERRED EMBODIMENT

Figure 1:
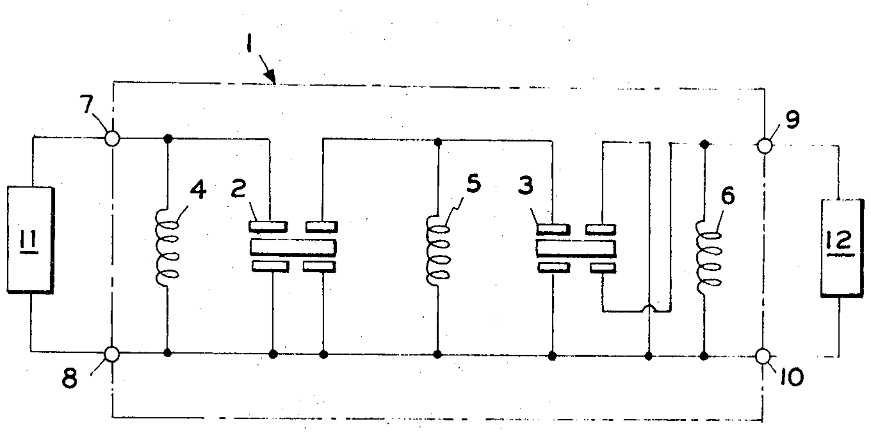
FIG. 1 is a chematic circuit diagram of a wave filter of the present invention.

Referring to FIG. 1 of the drawings, there is shown a novel piezoelectric ceramic band-pass wave filter of the present invention designated, as a whole, by reference numeral 1. This filter 1 comprises a first piezoelectric ceramic resonator 2, a second piezoelectric ceramic resonator 3, a first shunt inductance 4, a second shunt inductance 5, and a third shunt inductance 6. The filter 1 has the input terminals 7 and 8; and terminal 8 is grounded. The filter 1 has the output terminals 9 and 10; the terminal 10 is grounded. As illustrated in FIG. 1, a signal source 11 is connected between the input terminals 7 and 8, and a load 12 is connected between the output terminals 9 and 10.

In a practical application of the filter 1, the signal source 11 may be an amplifier of carrier wave receiver of multichannel carrier telecommunication and the load 12 may be a second amplifier of the receiver.

The first resonator 2 and the second resonator 3 are identical in size and shape, and are individually operated as electromechanical filters in a resonant mode of vibration at a predetermined frequency. The three shunt inductances 4, 5 and 6 may be conventional coil devices made of well-known elements such as variable $\mu$ inductors. The predetermined frequency is one of the frequencies of carrier waves which are used in multichannel telecommunication, particularly, in the frequency range from 30 to 100 kHz.

Figure 2:
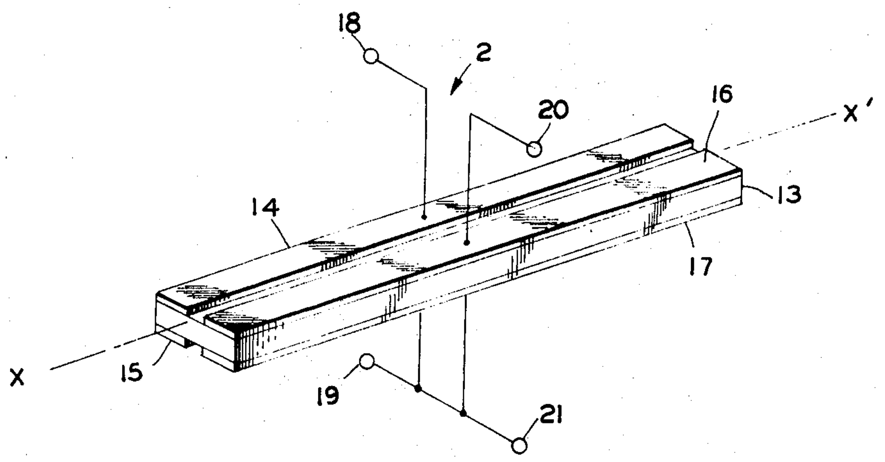
FIG. 2 is a perspective view of a four-terminal piezoelectric ceramic resonator of one type utilized in the present invention.

Referring to FIG. 2 of the drawings, there is shown the first piezoelectric ceramic resonator designated as a whole by reference numeral 2. The resonator 2 comprises a piezoelectric ceramic body 13 in the form of a rectangular thin plate. A pair of first input electrodes 14 and 15 are applied to the major opposed surfaces of major opposed surfaces of said ceramic body 13 in parallel with the longitudinal axis. A pair of first output electrodes 16 and 17 are also applied to the major opposed surfaces of said ceramic body 13 in parallel with the longitudinal axis. Said two pairs of electrodes 14 and 15, 16 and 17 are made substantially symmetrical with respect to longitudinal center axis $x—x'$ of said ceramic body 13 and have terminals 18 and 19, 20 and 21 attached thereto, respectively. The terminals 18 and 19 are shunted by the first shunt inductance 4 and are coupled with the terminals 7 and 8 of the filter 1, respectively.

The terminals 20 and 21 and shunted by the second shunt inductance 5 and are coupled with the second piezoelectric resonator 3. Said ceramic body 13 is polarized in the direction of its thickness.

One electrode of the pair of first input electrodes, for instance 14, acts as a first input electrode for electrical input signal and the other electrode 15 acts as a common electrode which is grounded. The other pair of electrodes 16 and 17 act as a first output electrode and another common electrode, respectively. When an electrical input voltage is supplied between the pair of first input electrode 14 and 15 of the resonator 2, one of the pair of first output electrodes, for instance, 16 derives an electrical signal induced by the resonator 2. The electric signal from said electrode 16 becomes maximum in the vicinity of the resonant frequency of the length extensional mode of vibration of the resonator 2.

Figure 3:
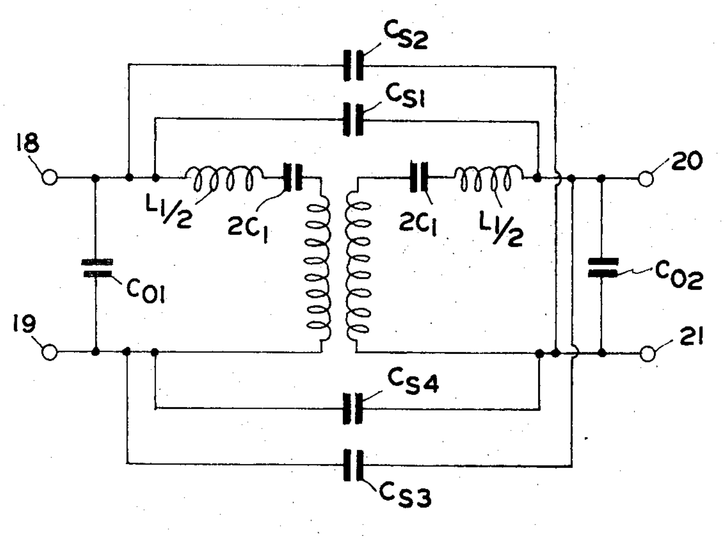
FIG. 3 is an equivalent circuit representation of the resonator shown in FIG. 2.

Referring to FIG. 3 wherein similar reference numerals 18 and 19, 20 and 21 designate the terminals similar to those of FIG. 2, the equivalent circuit consists essentially of shunt capacitances $C_{01}$ and $C_{02}$, two series resonance circuits of $L_1/2$ and $2C_1$, transformer T, and coupling capacitance $C_{s1}$, $C_{s2}$, $C_{s3}$ and $C_{s4}$. A piezoelectric ceramic resonator having two pair of electrodes is generally treated as a composite resonator which has two parts connected in cascade through an idealized transformer T.

The transformer T has a 1:1 impedance transformation ratio in a negative polarity. One of the input terminals of T is connected, through the series resonance circuit of $L_1/2$ and $2C_1$, with the input terminal 18, and the other input terminal of T is connected with the terminal 19 which in grounded. The series resonance circuit of $L_1/2$ and $2C_1$ represents the mechanical properties of one part of said resonator 2. The $L_1/2$ denotes the mass equivalent electrical inductance of said one part of resonator 2, the $2C_1$ denotes the compliance equivalent electrical capacity of said one part of resonator 2. The capacitance $C_{10}$ positioned across the terminals 18 and 19 is the clamped input capacity of said resonator 2.

Similarly, one of the output terminals of T is connected, through the other series resonance circuit of $L_1/2$ and $2C_1$, with the output terminal 20, and the other input terminal of T is connected with the terminal 21 which is grounded. Said other series resonance circuit of $L_1/2$ and $2C_1$ represents the mechanical properties of the other part of said resonator 2. The $L_1/2$ and $2C_1$ are similar to those of aforesaid definition. The capacitance $C_{02}$ positioned across the terminals 20 and 21 is the clamped output capacity of said resonator 2. The capacitance $C_{s1}$ which couples the terminals 18 and 20 is the through capacity between said electrodes 14 and 16. The capacitance $C_{s2}$ which couples the terminals 18 and 21 is the leakage capacity between said electrodes 14 and 17. The capacitance $C_{s3}$ which couples the terminals 19 and 20 is the leakage capacity between said electrodes 15 and 16. The capacitance $C_{s4}$ which couples the terminals 19 and 21 is the through capacity between said electrodes 15 and 17.

For practical use, the $C_{s4}$ is removed because the terminals 19 and 21 are grounded. The $C_{s2}$ and $C_{s3}$ are combined with the $C_{01}$ and $C_{02}$, respectively. For simplicity, T may be eliminated from the equivalent circuit of FIG. 3. Therefore, the equivalent circuit shown in FIG. 3 may be modified into a simplified equivalent representation shown by FIG. 4.

Figure 4:
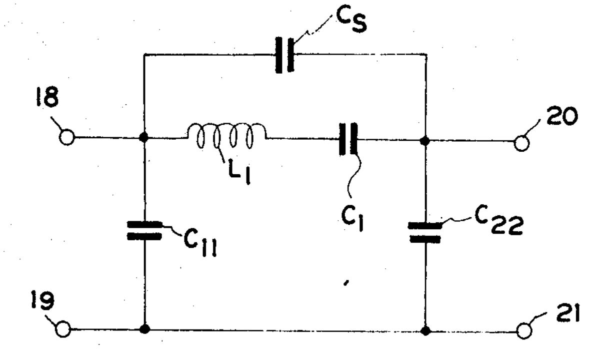
FIG. 4 is a simplified equivalent circuit representation of the resonator shown in FIG. 2.

Referring to FIG. 4, wherein similar reference characters designate elements similar to those of FIG. 3, the equivalent circuit consists of shunt capacitances $C_{11}$ and $C_{22}$, a series resonance circuit of $L_1$ and $C_1$ and a coupling capacitance $C_2$. The series resonance circuit of $L_1$ and $C_1$ is connected between the terminals 18 and 20 and represents, as a whole, the mechanical properties of said resonator 2. The $L_1$ is the total mass equivalent electrical inductance of said resonator, and the $C_1$ is the total compliance equivalent electrical capacity.

The $C_{11}$ positioned across the terminals 18 and 19 is the effective clamped input capacity of said resonator 2 and may be defined as follows:

$$C_{11}=C_{01}+2C_{s1}+C_{s2} \quad (1)$$

The $C_{22}$ positioned across the terminals 20 and 21 is the effective clamped output capacity of said resonator 2 and may be defined as follows:

$$C_{22}=C_{02}+2C_{sl}+C_{s3} \quad (2)$$

The $C_s$ which is connected in parallel with said series resonance circuit of $L_1$ and $C_1$ is the effective coupling capacity of said resonator 2 any may be defined as follows:

$$C_s=-C_{s1} \quad (3)$$

The electrical properties of the equivalent circuit as shown in FIG. 4 may now be explained. According to the image parameters method of electrical network theory, the transmission characteristics of said equivalent circuit may be characterized by four characteristic frequencies which are shown by the following:

$$Fr=\frac{1}{2\pi}\frac{1}{\sqrt{L_1C_1}} \quad (4)$$

$$Fa=\frac{1}{2\pi}\frac{1}{\sqrt{L_1C_1}}\sqrt{1+\frac{C_1(C_{11}+C_{22})}{C_{11}C_{22}-C_s(C_{11}+C_{22})}} \quad (5)$$

$$F\infty=\frac{1}{2\pi}\frac{1}{\sqrt{L_1C_1}}\sqrt{1-\frac{C_1}{C_s}} \quad (6)$$

$$Fm=\frac{1}{2\pi}\frac{1}{\sqrt{L_1C_1}}\sqrt{1+\frac{C_1(C_{11}+C_{22})}{2C_{11}C_{22}-C_s(C_{11}+C_{22})}} \quad (7)$$

where *Fr* is the lower cutoff frequency of the passband of said transmission characteristic, *Fa* is the upper cutoff frequency of the passband of said transmission characteristics, $F\infty$ is the pole frequency of maximum attenuation of said transmission characteristics, and *FM* is the frequency of the maximum transmission of said equivalent circuit.

Figure 5:
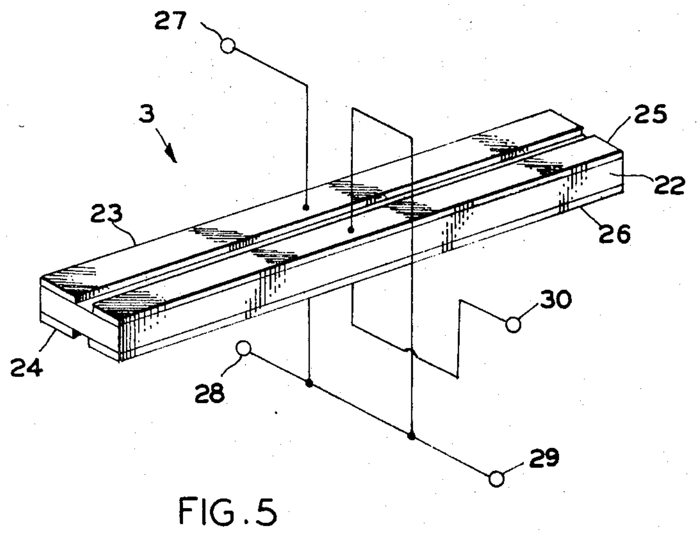
FIG. 5 is a perspective view of a four-terminal piezoelectric ceramic resonator of another type utilized in the present invention.

Referring to FIG. 5 of the drawings, there is illustrated the second piezoelectric ceramic resonator designated as a whole by reference numeral 3 and the electrical connections between electrodes of the resonator 3.

The second resonator 3 which is similar in configuration and dimension of the first resonator 2 consists of a ceramic body 22, two pairs of electrodes 23 and 24, 25 and 26 and two pairs of terminals 27 and 28, 29 and 30 connected with said electrodes 23, 24, 25 and 26, respectively. The electrical connections, however, are different from those of said first resonator 2.

When electrodes 23 and 24 act as a second input electrodes and a common electrode, respectively, one of the other pair of electrodes 25 is placed on the major surface having said second input electrode 23 thereon and acts as a common electrode, and the remainder of said other pair of electrodes 26 faced to said common electrode 25 acts as a second output electrode.

The terminals 27 and 28 are coupled with said terminals of the first resonator 20 and 21, respectively, and said second shunt inductance 5 is inserted therebetween. The terminals 29 and 30 are coupled with said output terminal 10 and 9, respectively and said third shunt inductance 6 is inserted therebetween.

The equivalent circuit of said second resonator 3 is similar to that of said first resonator 2 shown in FIG. 3, except that the impedance ratio of said transformer is positively 1:1. The simplified equivalent circuit of said resonator 3 may be shown in FIG. 6.

Figure 6:
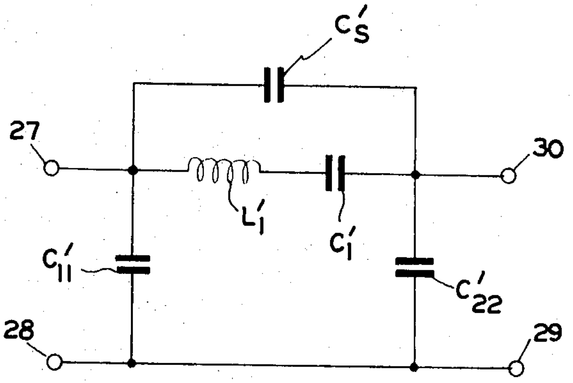
FIG. 6 is a simplified equivalent circuit representation of the resonator shown in FIG. 5.

Referring to FIG. 6 wherein similar reference numerals designate the terminals similar to those of FIG. 5, the equivalent circuit representation of said resonator 3 is identical with that of said resonator 2 except that each of the circuit elements is shown by a dotted numeral.

The shunt capacitances $C_{11}'$ and $C_{22}'$, and coupling capacitance $C_s'$ are defined as follows:

$$C_{11}'=C_{01}+C_{sl}. \quad (8)$$

$$C_{22}'=C_{02}+C_{s4} \quad (9)$$

$$C_s'=C_{s2} \quad (10)$$

And, the characteristic frequencies of said resonator 3 are shown by following relations:

$$Fr'=\frac{1}{2\pi}\frac{1}{\sqrt{L_1C_1}} \quad (11)$$

$$Fa'=\frac{1}{2\pi}\frac{1}{\sqrt{L_1C_1}}\sqrt{1+\frac{C_1(C'_{11}+C'_{22})}{C'_{11}C'_{22}+C'_s(C'_{11}+C'_{22})}} \quad (12)$$

$$F_\infty'=\frac{1}{2\pi\sqrt{L_1C_1}}\sqrt{1+\frac{C_1}{C'_s}} \quad (13)$$

$$Fm'=\frac{1}{2\pi\sqrt{L_1C_1}}\sqrt{1+\frac{C_1(C'_{11}+C'_{22})}{2C'_{11}C'_{22}+C'_s(C'_{11}+C'_{22})}} \quad (14)$$

Each of said two resonators has the coupling capacitances $C_{s1}$ ....., $C_{s4}$, which are much smaller than the shunt capacitances $C_{01}$ and $C_{02}$. All the coupling capacitances are substantially equal to $C_s$, and the shunt capacitances $C_{10}$ and $C_{02}$ are substantially equal to $C_0$.

These relations usually hold for the thin rectangular-type piezoelectric ceramic resonator of the present invention and are applied to the equations (5) to (14). As a result said two resonators 2 and 3 may have the following relationship:

$$Fr'=Fr\doteq\frac{1}{2\sqrt{L_1C_1}} \quad (15)$$

$$Fa'=Fa\doteq\frac{1}{2\pi\sqrt{L_1C_1}}\sqrt{1+\frac{2C_1}{C_0}} \quad (16)$$

$$F_\infty'=\frac{1}{2\pi\sqrt{L_1C_1}}\sqrt{1-\frac{C_1}{C_s}} \quad (17)$$

$$Fm'=Fm\doteq\frac{1}{2\pi\sqrt{L_1C_1}}\sqrt{1+\frac{C_1}{C_0}} \quad (18)$$

$$F_\infty'\doteq\frac{1}{2\pi\sqrt{L_1C_1}}\sqrt{1+\frac{C_1}{C_s}} \quad (19)$$

Figure 8:
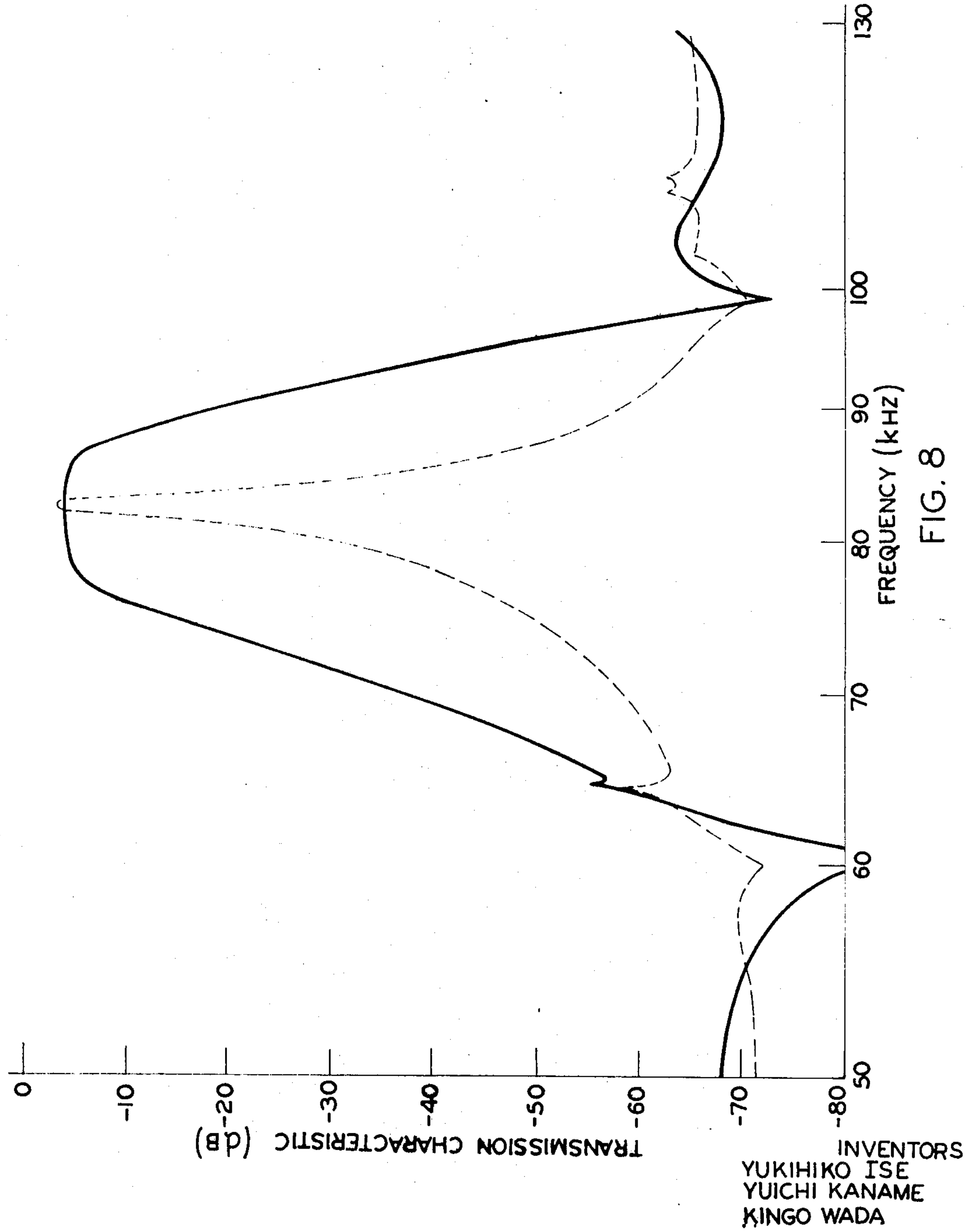
FIG. 8 is a graphical representation of the transmission characteristics of a filter of the present invention.

These relationships (15) to (19) express characteristic frequencies of a filter which has normal transmission characteristics. The filter having said two resonators directly connected in cascade shows normal transmission characteristics as shown in FIG. 8.

Said filter is characterized by the following relationships:

$$\frac{\Delta F}{Fr}=\frac{Fa-Fr}{Fr}\doteq\frac{C_1}{C_0} \quad (20)$$

$$C_s=\frac{C_0}{2}\,\frac{Fa^2-Fr^2}{Fr^2-F\infty^2} \quad (21)$$

$$C_s'=\frac{C_0'}{2}\,\frac{Fa'^2-Fr'^2}{F\infty'^2-Fr'^2} \quad (22)$$

and $$C_s'\doteq C_s \quad (23)$$

where the $\Delta F$ is the passband width of said filter, the $\Delta F/Fr$ is the bandwidth ratio of said filter, the $C_1/C_0$ is the capacitance ratio of said resonators, the $F\infty'$ and $F\infty$ are the upper and lower pole frequencies which may be predetermined, with respect to the design of filter characteristics, the $Fr$ and $Fa$, $Fr'$ and $Fa'$ are the resonant and antiresonant frequencies of said resonators, respectively.

Figure 7:
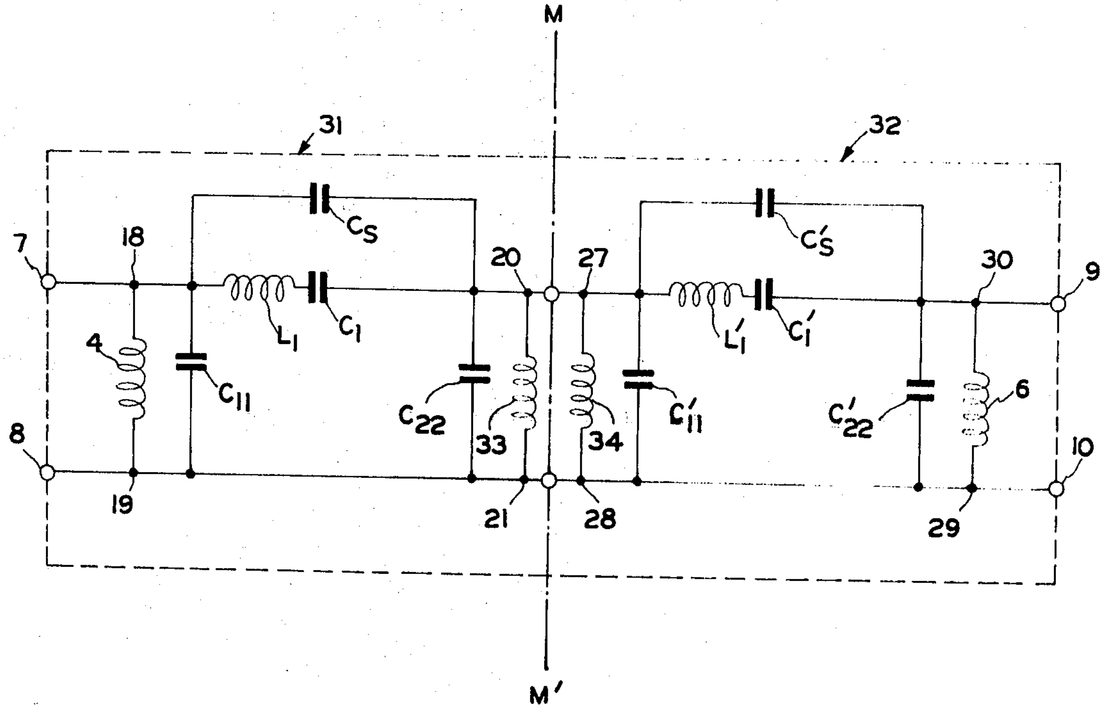
FIG. 7 is a simplified equivalent circuit representation of the filter shown in FIG. 1.

Referring again the filter circuit of FIG. 1, the bandwidth characteristics of said two cascaded resonators filter can be significantly improved by the presence of the shunt inductances 4, 5 and 6 in accordance with the present invention, as will be evident with reference to FIG. 7 which shows the simplified equivalent circuit of said piezoelectric band-pass filter.

Referring to FIG. 7 wherein similar reference characters designate elements similar to those of FIGS. 1, 4 and 6, the equivalent circuit of said band-pass filter 1 can be represented by two unit filters 31 and 32 which are obtained by dividing said band-pass filter 1 through a midline *M—M'*. The first unit filter 31, includes the first piezoelectric ceramic resonator 2, the first shunt inductance 4 and an inductance 33 which is connected in parallel with the output terminals 20 and 21 of said first resonator. The second unit filter 32 includes the second ceramic resonator 3, the third shunt inductance 6 and an inductance 34 which is connected in parallel with the input terminals 27 and 28 of said second resonator. In such case, each of said two inductances 33 and 34 has a value which is approximately equal to twice that of said second shunt inductance 5. The equivalent circuit of the first unit filter 31 can have transmission characteristics similar to those of the equivalent circuit of FIG. 4. It has been discovered according to the present invention that the optimum transmission characteristics of a band-pass filter are achieved when the characteristic frequencies of said first unit filter 31 satisfy approximately the following relations:

$$fm=\frac{1}{2\pi\sqrt{L_1C_1}} \quad (24)$$

$$fl=\frac{1}{2\pi\sqrt{L_1C_1}}\sqrt{\frac{C_{11}+C_1-C_s-\sqrt{(C_1-C_s)^2+2C_1C_{11}}}{C_{11}-2C_s}} \quad (25)$$

$$fu=\frac{1}{2\pi\sqrt{L_1C_1}}\sqrt{\frac{C_{11}+C_1-C_s+\sqrt{(C_1-C_s)^2+2C_1C_{11}}}{C_{11}-2C_s}} \quad (26)$$

$$f\infty=\frac{1}{2\pi\sqrt{L_1C_1}}\sqrt{1-\frac{C_1}{C_s}} \quad (27)$$

and, said first shunt inductance 4 and said inductance 33 obey the following relationship:

$$\frac{1}{2\pi\sqrt{L_1C_1}}=\frac{1}{2\pi\sqrt{L_{01}C_{11}}}=\frac{1}{2\pi\sqrt{L_{02}'C_{22}}} \quad (28)$$

where *FM* is the center frequency of the passband of said unit filter 31, fl is the lower cutoff frequency of said unit filter 31, *fl* is the upper cutoff frequency of said unit filter 31, $f\infty$ is the frequency of the pole of attenuation, $L_{01}$ is the first shunt inductance, and $L_{02}'$ is the inductance of said inductance 33 which is approximately equal to $2L_{02}$, $L_{02}$ is the second shunt inductance 5. Putting the equations (4) and (6) into (24), (25), one can obtain:

$$FM=Fr \quad (29)$$

$$F\infty=F\infty \quad (30)$$

According to the aforesaid assumptions with reference to the capacitances of said resonator 2, one can simplify the equations (25) and (26), and may calculate the passband width of said unit filter 31 as follows:

$$\Delta f=fu-fl\doteq\frac{1}{2\pi\sqrt{L_1C_1}}\sqrt{\frac{2C_1}{C_0}} \quad (31)$$

Similarly, the characteristic frequencies of said second unit filter 32 for optimum transmission characteristics can be approximately shown by the following relations:

$$f_m'=\frac{1}{2\pi\sqrt{L_1C_1}} \quad (32)$$

$$f_l'=\frac{1}{2\pi\sqrt{L_1C_1}}\sqrt{\frac{C_{11}'+C_1+C_s'-\sqrt{(C_1+C_s)^2+2C_1C_{11}}}{C_{11}'+2C_s'}} \quad (33)$$

$$f_u'=\frac{1}{2\pi\sqrt{L_1C_1}}\sqrt{\frac{C_{11}'+C_1+C_s'+\sqrt{(C_1+C_s')^2+2C_1C_{11}}}{C_{11}'+2C_s'}} \quad (34)$$

$$f\infty'=\frac{1}{2\pi\sqrt{L_1C_1}}\sqrt{1+\frac{C_1}{C_s'}} \quad (35)$$

And, said third shunt inductance 6 and said inductance 34 satisfy the following relationships:

$$\frac{1}{2\pi\sqrt{L_1C_1}}=\frac{1}{2\pi\sqrt{L_{03}C_{22}'}}=\frac{1}{2\pi\sqrt{L_{02}''C_{11}'}} \quad (36)$$

where, $fm'$ is the center frequency of the passband of said second unit filter 32, $fl'$ is the lower cutoff frequency of said second unit filter 32, $fu'$ is the upper cutoff frequency of said second unit filter 32, $f\infty'$ is the pole frequency of attenuation of said second unit filter, $L_{03}$ is the third shunt inductance and $L_{02}''$ is the inductance of said inductance 34 which has a value approximately equal of $2L_{02}$.

Putting the equations (11) and (13) into (32) and (35) and simplifying the equations (33) and (34) under the aforesaid relations with reference to the capacitances of said resonator 3, one can obtain the following relations:

$$fm'=Fr'=Fr=FM \quad (37)$$

$$f\infty'=F\infty' \quad (38)$$

$$\Delta f'=fu'-f_l'\doteqdot\frac{1}{2\pi\sqrt{L_1C_1}}\sqrt{\frac{2C_1}{Co}}=\Delta f \quad (39)$$

where $\Delta f'$ is the passband width of said second half section filter 32. Therefore, the piezoelectric ceramic band-pass filter 1 according to the present invention is characterized by the properties as shown in the following:

a. The center frequency of said filter 1 coincides with the resonant frequency of said first piezoelectric ceramic resonator 2;

b. The passband width of said filter 1 is $\sqrt{2(C_o/C_1)}$ times as broad as that of said two resonators which are directly cascaded;

c. The two pole frequencies of attenuation of said filter 1 are in symmetrical position with respect to the center frequency of said filter 1 and are predetermined;

d. The second shunt inductance is the sum of the said two inductances $L_{02}'$ and $L_{02}''$, and has a value approximately equal to $(1/(2\pi fm)^2 (C_{11}'+C_{22})$ e. Each of the three shunt inductances has a value which tunes the respective capacitances between the pairs of electrodes;

f. The order of the two unit filters 31 and 32 in cascade may be interchangeable.

Referring to FIG. 8, the transverse axis shown frequency, and the vertical axis shows the voltage transmission characteristics in db. The solid curve of FIG. 8 shows the transmission characteristic of said filter 1 according to the present invention. The dotted curve shows the transmission characteristics of said two resonators which are directly connected in cascade without said shunt inductances.

It is important that the passband width of said filter is much broader than that of said two resonators without said shunt inductance and that the frequency characteristics of said filter 1 has a flat response in the pass band and a sharp cutoff characteristic at the cutoff frequencies.

The piezoelectric ceramic band-pass filter according to the present invention may be applied to a carrier wave filter of multichannel telecommunication. In such case, the channel program i.e. a frequency allotment of carrier waves in a given frequency range must be taken account in the spurious response characteristics of said filter.

If the spurious responses of said carrier filter for one channel are in the passband of another channel, said spurious responses cause interference of the carrier signals. For example, FIG. 9 shows the spurious response characteristics of said filter of the present invention.

Figure 9:
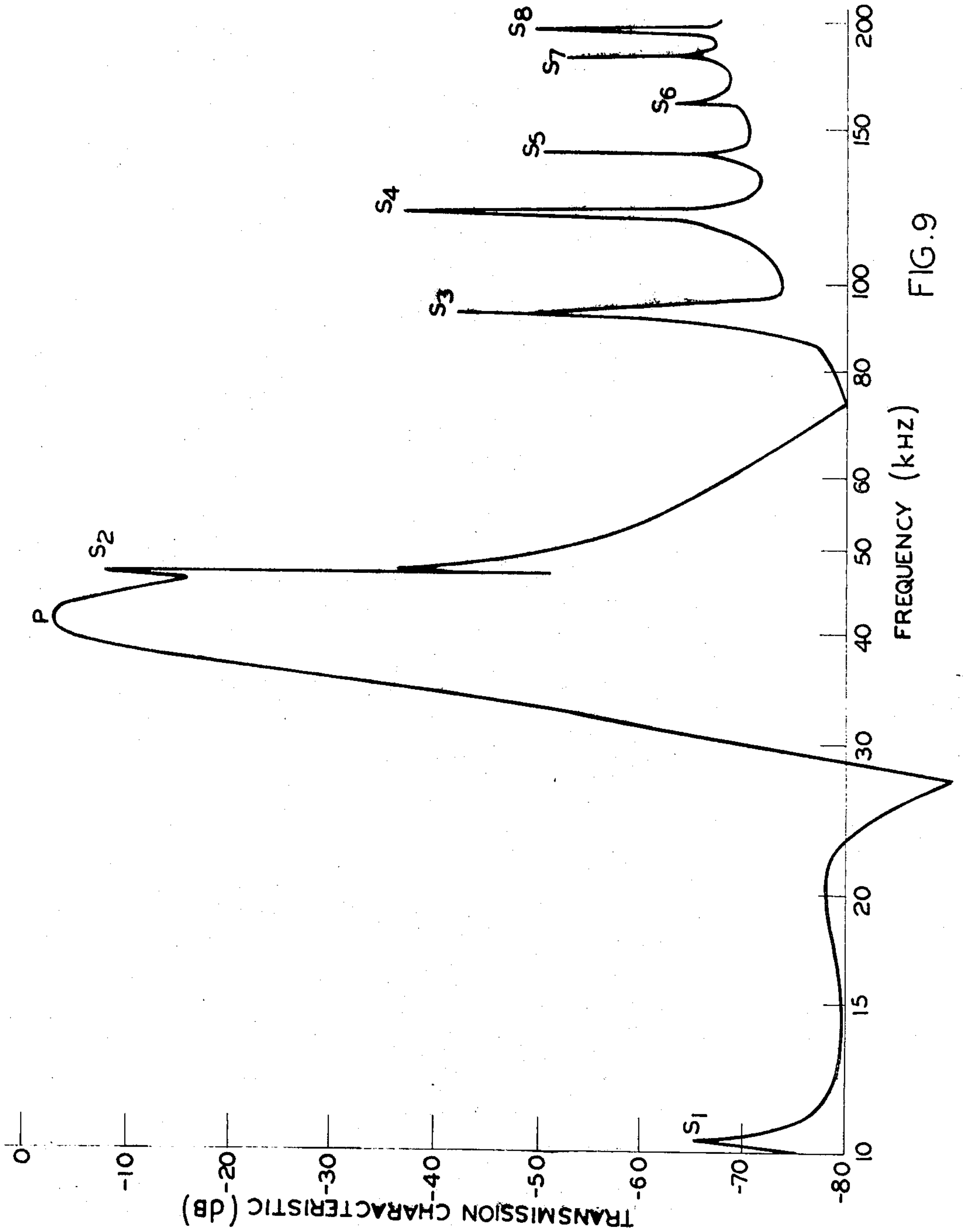
FIG. 9 is one example of a graphical representation of the frequency response of a filter having acenter frequency of 42 kHz. in accordance with the present invention.

Referring to FIG. 9, the transverse axis shows frequency in kHz. and the vertical axis shows voltage transmission characteristics in db. Reference character P shows the passband of said filter for the 42 kHz. carrier wave channel, and $S_1$,............ , $S_8$ show the spurious responses of said filter by the presence of flexural resonant modes of vibration and higher length extensional modes of vibration of said resonators. Therefore, it is necessary that the carrier frequencies of different channel be out of these spurious ranges. Said frequencies of carrier waves are determined by the dimension of said piezoelectric ceramic resonator while said spurious response characteristics depend on the width/length ratios of said resonator. When said piezoelectric ceramic resonators have width/length ratios of approximately 0.14, 0.18, 0.22, 0.27 or 0.36, the most suitable channel program can be achieved in accordance with the present invention.

A pair of piezoelectric ceramic resonators of a piezoelectric ceramic band-pass filter according to the present invention are made by employing a piezoelectric ceramic material, for example, the piezoelectric ceramic material described in the U.S. Pat. No. 3,268,453 having the piezoelectric characteristics for length extensional mode of vibration as listed in table 1.

Table 1

| | |
|---|---|
| frequency constant | 1,800 kHz.-mm. |
| dielectric constant | 1,350 |
| capacitance ratio ($C_o/2C_1$) | 25 |
| mechanical Q | 500 |

Said piezoelectric ceramic resonators are in the form of the thin rectangular plates having two pairs of electrodes as shown in FIG. 2.

In a specific embodiment, the piezoelectric ceramic band-pass filter according to the present invention may be used for multichannel telecommunication of five channels in the frequency range from 30 to 120 kHz. Said piezoelectric band-pass filter for each channel of said five channels includes two identical piezoelectric ceramic resonators having the width/length ratio and the dimension listed in table 2 and three shunt inductances having respective values listed in table 3.

Table 2

| channel No. | width/length ratio | dimension (mm.) |
|---|---|---|
| 1 | 0.138 | 43.5×6.0×0.8 |
| 2 | 0.178 | 33.7×6.0×0.8 |
| 3 | 0.220 | 27.3×6.0×0.8 |
| 4 | 0.272 | 22.1×6.0×0.8 |
| 5 | 0.362 | 16.6×6.0×0.8 |

Table 3

| channel No. | inductance (mh.) | | |
|---|---|---|---|
| | first | second | third |
| 1 | 9.86 | 4.93 | 9.86 |
| 2 | 7.64 | 3.82 | 7.64 |
| 3 | 6.19 | 3.09 | 6.19 |
| 4 | 5.01 | 2.51 | 5.01 |
| 5 | 3.76 | 1.88 | 3.76 |

variable range of the inductors: ±25%

The piezoelectric band-pass filter is characterized by a broad passband width (more than 6 kHz), a low-voltage transmission (less than −50 db), and a small size in accordance with the present invention.

While there have been described what are at present considered to be the preferred embodiments of the invention, it will be obvious to those skilled in the art that various changes and modifications may be made therein without departing from the invention.

TABLE 4

| Channel No. | 1 | 2 | 3 | 4 | 5 |
|---|---|---|---|---|---|
| Center frequency (kHz.) | 42.3 | 54.6 | 67.4 | 83.3 | 111 |
| Matching resistance (input and output) (Kohms) | 10 | 10 | 10 | 10 | 10 |
| Insertion loss (db) | 3 | 2.5 | 2 | 2 | 2 |
| Band width at −6db (kHz) | 6 | 7.5 | 9 | 12 | 14 |
| Band width at −40 db (kHz.) | 13 | 17 | 21 | 24 | 27 |
| Adjacent channel separation (db) | >50 | >50 | >40 | >45 | >40 |
| Housing dimension (mm.) | | | 8×20×60 | | |

What is claimed is:

1. A band-pass wave filter comprising a first piezoelectric ceramic resonator which is provided with a pair of first input electrodes and a pair of first output electrodes, and which has a resonant mode of vibration at a predetermined frequency; a second piezoelectric ceramic resonator which is provided with a pair of second input electrodes and a pair of second output electrodes, and which has a resonant mode of vibration at a said predetermined frequency; a first shunt inductance combined in parallel with said pair of first input electrodes; a second shunt inductance being in a shunt between said pair of first output electrodes and said pair of second input electrodes; and a third shunt inductance which is connected in parallel with said pair of second output electrodes and which is opposite in the polarity to said pair of second input electrodes; said first shunt inductance tuning with a capacitance between said pair of first input electrodes; said second shunt inductance tuning with a combination of a capacitance between said pair of first output electrodes and a capacitance between said pair of second input electrodes; and said third inductance tuning with a capacitance between said pair of second output electrodes.

2. A band-pass wave filter according to claim 1 wherein one of said two resonators have an input electrode and an output electrode positioned on one major surface thereof and two common electrodes positioned on another major surface thereof, and the other of said two resonators has an input electrode and a common electrode positioned on one major surface thereof and a common electrode and an output electrode positioned on another major surface thereof, whereby said input electrode at said one major surface is faced to said common electrode at said another major surface through a ceramic body of said resonator, said piezoelectric ceramic resonators being a thin rectangular plate and having a longitudinal resonant mode of vibration, all of said electrodes being extended on opposite major surfaces in parallel with the longitudinal axis of said resonator and being positioned symmetrically against said longitudinal axis, and all of said common electrodes being grounded.

3. A band-pass wave filter according to claim 2 wherein said one piezoelectric ceramic resonator has the following relation in connection with capacitance thereof:

$$C_s = \frac{C_o}{2} \cdot \frac{Fa^2 - Fr^2}{Fr^2 - F^2_{\infty_1}}$$

where $C_s$ is a coupling capacitance between said input and output electrodes; $C_o$ is a shunt capacitance between said input electrode and said common electrode; $Fr$ and Fa are resonant and antiresonant frequencies of said resonator, respectively; $F\infty_1$ is a predetermined frequency of a pole of attenuation with reference to a transmission characteristic of said resonator; and said another resonator has the following relation in connection with capacitance thereof:

$$C'_s = + \frac{C_o'}{2} \frac{Fa'^2 - Fr'^2}{F\infty'^2 - Fr'^2}$$

where $C_s'$ is a coupling capacitance between said input and output electrodes; $C_o'$ is a shunt capacitance between said input electrode and said common electrode; $Fr'$ and $Fa'$ are resonant and antiresonant frequencies of said resonator, respectively; $F\infty'$ is a predetermined frequency of a pole of attenuation with reference to a transmission characteristic of said resonator.

4. A band-pass wave filter according to claim 3 wherein said first inductance has a value approximately equal to $$(1/(2\pi Fr)^2 C_{01}'$$

where $Fr$ is a resonant frequency of said first resonator, and $C_{01}$ is a shunt capacitance between said pair of first input electrodes; said second inductance has a value approximately equal to $$(1/(2\pi Fr)^2 (C_{02} + C_{01}')$$

where $C_{02}$ is a shunt capacitance between said pair of first output electrodes, and $C_{01}'$ is a shunt capacitance between said pair of second input electrodes; said third shunt inductance has a value approximately equal to $$(1/(2\pi Fr')^2 C_{02}'$$

where $Fr'$ is a resonant frequency of said second resonator, and $C_{02}'$ is a shunt capacitance between said second output electrodes.

5. A band-pass wave filter according to claim 1 wherein each of said first and second piezoelectric resonators is a thin rectangular plate having a width/length ratio selected from the group consisting of 0.14, 0.18, 0.22, 0.27 and 0.36.

* * * * *